United States Patent [19]

Iwamoto et al.

[11] 4,452,044

[45] Jun. 5, 1984

[54] POWER CONTROL SYSTEM FOR A TURBOCHARGED INTERNAL COMBUSTION ENGINE

[75] Inventors: Kenzi Iwamoto, Nishio; Hisasi Kawai, Toyohashi; Ryuichi Matushiro, Okazaki; Koichi Moriguchi, Nagoya; Nobutaka Mizuno; Yasuhiro Ikuta, both of Okazaki, all of Japan

[73] Assignees: Nippon Soken, Inc., Nishio; Toyota Jidosha Kogyo Kabushiki Kaisha, Toyota, both of Japan

[21] Appl. No.: 367,616

[22] Filed: Apr. 12, 1982

[30] Foreign Application Priority Data

Apr. 14, 1981 [JP] Japan .................................. 56-55958

[51] Int. Cl.³ ............................................. F02B 37/12
[52] U.S. Cl. ..................................................... 60/600
[58] Field of Search ................. 60/600, 601, 602, 603

[56] References Cited

U.S. PATENT DOCUMENTS

| | | | |
|---|---|---|---|
| 3,233,403 | 2/1966 | MacInnes et al. | 60/600 |
| 3,389,553 | 6/1968 | Hardy et al. | 60/602 X |
| 4,005,578 | 2/1977 | McInerney | 60/602 |
| 4,005,579 | 2/1977 | Lloyd | 60/602 |
| 4,203,296 | 5/1980 | Tanaka et al. | 60/602 |
| 4,387,570 | 6/1983 | Iwamoto et al. | 60/600 |
| 4,392,352 | 7/1983 | Stumpp et al. | 60/602 |

FOREIGN PATENT DOCUMENTS 54-148920  11/1979  Japan .................................. 60/602

Primary Examiner—Michael Koczo
Attorney, Agent, or Firm—Cushman, Darby & Cushman

[57] ABSTRACT

A power control system for a supercharged internal combustion engine. The system has a passage providing a communication between the compressor outlet of the supercharger and an exhaust by-pass valve actuator, the passage being communicated at its other end with the compressor inlet of the supercharger. A variable orifice valve is disposed at an intermediate portion of the passage opening to the exhaust by-pass valve actuator and the compressor inlet. Control means is provided to control the opening of the variable orifice valve in accordance with the amount of depression of the accelerator pedal of the vehicle or the opening of the throttle valve of the engine.

2 Claims, 5 Drawing Figures

POWER CONTROL SYSTEM FOR A TURBOCHARGED INTERNAL COMBUSTION ENGINE

The present invention relates to the power control of supercharged internal combustion engines and, more particularly, to a power control system capable of controlling the operation of the supercharger in accordance with the state of operation of the engine.

Various types of superchargers for internal combustion engines have been known such as mechanically driven superchargers, exhaust turbo-chargers, and exhaust gas impulse type superchargers, among which the exhaust turbo-chargers are most popular in these days. In the conventional supercharged internal combustion engines, the supercharge is made over the half-throttle to full-throttle operation range and, when the supercharging pressure has become excessively high, an intake by-pass means or an exhaust by-pass means is suitably operated to achieve the desired increase of the output power of the engine in the full-throttle operation range.

It is, however, not a better policy to effect the supercharge over the entire range of engine operation. Namely, in the partial load operation of an engine, for example, an engine of exhaust turbocharger type, the effect of the supercharging is suppressed because the intake air pressurized by the supercharger is restricted by the throttle valve. On the other hand, the supercharging by the exhaust turbocharger inevitably causes an increase of the exhaust pressure of the engine, because of the resistance encountered by the exhaust gas when the latter flows through the exhaust gas turbine. In addition, the temperature of the intake air is raised undesirably due to the compression by the turbo compressor, so that the charging efficiency is lowered and, accordingly, the expansion work is decreased uneconomically, resulting in a reduction of the engine output power. It is also to be pointed out that, in the spark-ignition type engines, the tendency of engine knock is increased and, in order to avoid this, it is necessary to retard the ignition timing. This also results in a reduction of the engine output power to deteriorate the effect of the supercharging. Furthermore, the continuous supercharging over the entire range of engine operation means that load is continuously imposed not only on the supercharger itself but also on the exhaust and intake systems, adversely affecting the durability and reliability of the supercharged internal combustion engine.

Accordingly, an object of the invention is to provide a power control system for supercharged internal combustion engines capable of overcoming the above-described problems of the prior art.

To this end, according to the invention, there is provided a power control system for supercharged internal combustion engines, having the features as summarized below.

Namely, in the power control system of the invention, an exhaust by-pass valve is opened when the compressor outlet pressure of the supercharger reaches a value (Pdc) which is at least lower than the maximum supercharging pressure )PdL) demanded by the engine, thereby to prevent the compressor outlet pressure from becoming higher. In addition, when an engine output power greater than that corresponding to the supercharging pressure (Pdc) is required, the amount of depression of the accelerator pedal or the throttle valve opening is detected and a supercharging pressure (Pd) corresponding to the amount of depression of the accelerator pedal or the throttle valve opening is obtained. Therefore, according to the invention, it is possible to decrease as much as possible the pressure difference across the throttle valve, i.e. the difference between the compressor outlet pressure (Pd) and the intake pressure (PB), thereby to avoid the aforementioned meaningless rise of the exhaust pressure and the intake air temperature, to improve the performance of the supercharged internal combustion engine. The above and other objects, features and advantages of the invention will become clear from the following description of the preferred embodiments taken in conjunction with the accompanying drawings in which:

Figure 1:
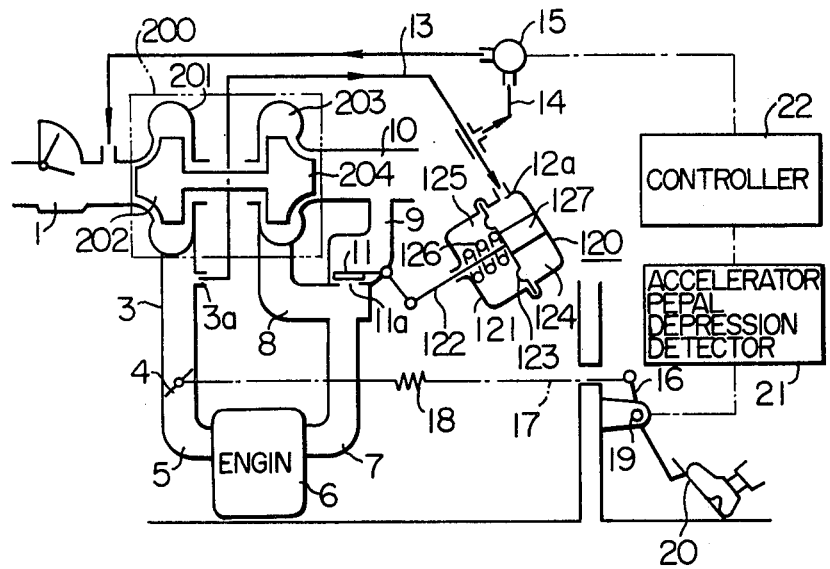
FIG. 1 is a schematic illustration of the power control system for supercharged internal combustion engines, in accordance with an embodiment of the invention.

Referring to FIG. 1, an air flowmeter 1 is adapted to measure the flow rate of the intake air sucked by an internal combustion engine 6 and to deliver an output signal representing the air flow rate to an electronic fuel injection controller which is not shown. A supercharger 200 has, as known per se, a compressor housing 201, compressor impeller 202, turbine impeller 204 integral and coaxial with the compressor impeller, and a turbine housing 203.

The air pressurized and discharged by the supercharger 200 flows through an intake pipe 3 from a portion of which branched is a pressure pick-up port 3a for picking up the compressor outlet pressure Pd. A throttle valve 4 disposed at the downstream side portion of the intake pipe is operatively connected to an accelerator pedal which will be mentioned later. A reference numeral 5 designates an intake manifold through which the intake air is supplied into the cylinders of the engine 6 at the pressure (PB) determined by the opening of the throttle valve 4. A reference numeral 7 designates an exhaust manifold in which the exhaust gas discharged from respective cylinders gathers. The exhaust manifold 7 is branched at its downstream side into an exhaust pipe 8 leading to the turbine housing 203 of the supercharger 200 and an exhaust by-pass pipe 9 which directly merges in an exhaust passage 10 detouring the supercharger 200. The exhaust by-pass pipe 9 has an inlet opening 11a which is controlled by an exhaust by-pass valve 11 which is connected to an exhaust by-pass valve actuator 120 through a link 122. This actuator 120 is constituted by a casing 121, diaphragm 123 mounted in the casing 121 and connected to the exhaust by-pass valve 11 through the link 122, a pressure chamber 124 which is adapted to receive the compressor outlet pressure (Pd) picked up through the pressure pick-up port 3a and transmitted thereto through the pipe 13, at a pressure (Pw) controlled by a later-mentioned variable orifice valve 15, an atmospheric chamber 125 opened to the atmosphere, a spring 126 disposed in the atmospheric chamber 125 and adapted to bias the diaphragm 123, and a stopper member 127 which is disposed in the pressure chamber 124 and adapted to limit the operation range (initial load) of the diaphragm 123. The pipe 13 constituting the passage for the pressurized air is branched into a pressure introduction port 12a opening to the pressure chamber 124 and a pipe 14 which opens to the inlet of the compressor housing 201. The aforementioned variable orifice valve 15, disposed at an intermediate portion of the pipe 14, is adapted to change its opening area in accordance with the change in the amount of depression of the later-mentioned accelerator pedal. A link 16 connected to the accelerator pedal 20 is adapted to rotate around a pivot shaft 19 in accordance with the amount of depression of the accelerator pedal 20. A link 17 operatively connected to the throttle valve 4 is secured to the other end of the link 16. A tension spring 18 connected to an intermediate portion of the link 17 is adapted to absorb the excessive movement of the accelerator pedal 20 after the full opening of the throttle valve 4.

A reference numeral 21 designates a detector for detecting the amount of depression of the accelerator pedal. The output from the detector 21 is delivered to the variable orifice valve controller 22 which delivers a control signal for determining the opening of the variable orifice valve 15 corresponding to the amount of depression of the accelerator pedal 20.

The operation of the power control system having the construction described heretofore will be explained hereinunder with reference to FIGS. 1, 2 and 3.

Figure 2:
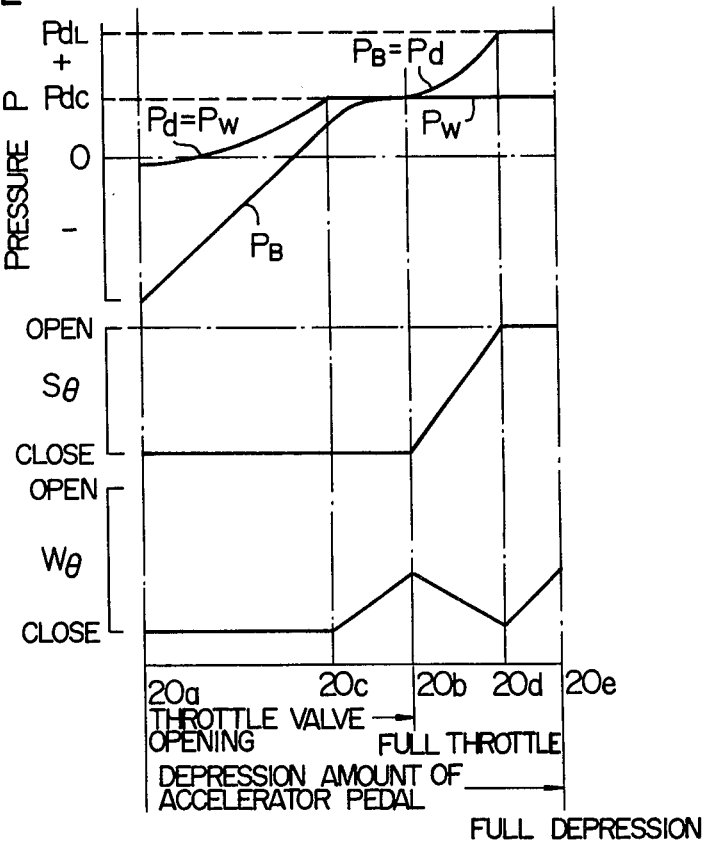
FIGS. 2 and 3 are illustrations of operation of the power control system of the first embodiment.
Figure 3:
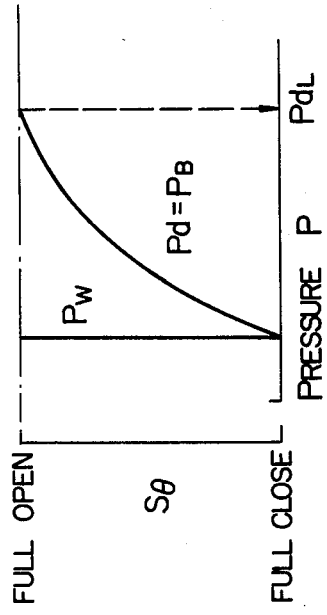

FIG. 2 shows the changes in the opening of the throttle valve 4, compressor outlet pressure (Pd), pressure (PB) in the intake maifold 5, pressure (Pw) in the pressure chamber 124 of the exhaust by-pass valve actuator 120, opening $S\theta$ of the variable orifice valve 15 and the opening $W\theta$ of the exhaust by-pass valve 11, in relation to the amount of depression of the accelerator pedal 20.

In the case of a vehicle mounting an internal combustion engine, the control of the engine power after the start up of the engine is effected mainly by the accelerator pedal 20. As the accelerator pedal 20 is depressed from the no-load position 20a through an intermediate position 20c to a partial load position 20b as shown in FIG. 2, the throttle valve 4 is rotated from the idle position which is an almost full-close position to a full opening position continuously through the action of the links 16, 17 and the spring 18. The spring 18, however, has a spring constant which is determined such that it acts as a rigid member in the above-mentioned range of the throttle operation. The movement of the accelerator pedal 20 is detected by the aforementioned detector 21 which delivers a signal representing the depression amount of the pedal 20 to the controller 22. The controller 20 provides a signal for closing the variable orifice valve 15 when the amount of the depression of the accelerator pedal ranges between the positions 20a and 20b.

As the accelerator pedal 20 is moved from the position 20a to the position 20b, the throttle valve 4 is opened by an amount corresponding to the amount of depression of the accelerator pedal 20, so that the flow rate of the intake air sucked by the engine is increased. This in turn increases the energy possessed by the exhaust gas from the engine 6 so that the supercharger 200 is driven with higher driving energy to produce a higher compressor outlet pressure. Thus, when the throttle valve takes the intermediate position 20c, the compressor outlet pressure (Pd) takes a high level of (Pdc). This compressor outlet pressure (PD) is picked up through the pressure pick-up port 3a and is introduced into the pressure chamber 124 of the exhaust by-pass actuator 120 through the pipe 13. In this state, since the variable orifice valve 15 is fully closed, the pipe 14 is not communicated with the blower inlet, so that the pressure (Pd) at the compressor outlet takes the same level as the pressure (Pw) in the pressure chamber 124. Provided that the initial load of the spring 126 is set by the stopper 127 at the same level as the pressure (Pdc), the diaphragm 123 is depressed when the compressor outlet pressure (Pd) comes up to exceed the pressure (Pdc), so that the diaphragm drives the exhaust by-pass valve 11 in the opening direction through the action of the link 122. In consequence, the exhaust by-pass port 11a is opened to permit a part of the exhaust gas from the engine 6 to flow into the exhaust by-pass pipe 9. This means that the flow rate of the exhaust gas introduced into the turbine chamber 203 of the supercharger for driving the same is decreased. In consequence, the work done by the compressor impeller integral with the turbine impeller is decreased to lower the compressor outlet pressure (Pd). Thanks to this feedback system, the compressor outlet pressure (Pd) is always maintained at a pressure lower than the level (Pdc). As the accelerator pedal 20 is further depressed from the position 20c to a position 20b, the throttle valve 4 is fully opened and the pressure (PB) downstream from the throttle valve 4 is increased to approximate the level (Pdc), so that the engine output power is increased to a level corresponding to the intake or supercharging pressure (Pdc).

When a further increase of the engine power is required, as in the case of climbing or acceleration, the pressure (PB) downstream from the throttle valve 4 is increased in a manner explained below to increase the engine output power. Namely, as the accelerator pedal 20 is further depressed from the position 20b to the position 20d, the detector 21 detects the amount of depression and provides an output corresponding to the detected amount to the variable orifice valve controller 22 which in turn delivers an opening signal corresponding to the depression amount to the variable orifice valve 15. Therefore, the compressor outlet pressure, which is transmitted through the pipe 13, is led to the compressor inlet which is materially under the atmospheric pressure, through the pipe 14 and the variable orifice valve 15. In this state, there is a difference between the pressure (Pw) introduced into the pressure chamber 124 and the compressor outlet pressure (Pd), and the relationship as shown in FIG. 3 is observed between the pressures (Pw), (Pd) and the opening $S\theta$ of the variable orifice valve. Namely, the opening $S\theta$ of the variable orifice valve 15 is changed in the increasing direction in accordance with the increase of depression of the accelerator pedal, as shown in FIG. 2. In consequence, the opening ($W\theta$) of the exhaust by-pass valve 11 is shifted in the closing direction as shown in the lower part of FIG. 2, as the accelerator pedal 20 is depressed from the position 20b to the position 20d. In consequence, the flow rate of the exhaust gas by-passing through the exhaust by-pass part 11a is gradually decreased. This in turn means that the rate of supply of the exhaust gas into the turbine housing 203 is increased in accordance with the increase of depression of the accelerator pedal 20. In consequence, the flow rate of the exhaust gas working on the turbine impeller and, hence, the work done by the compressor impeller are increased to raise the compressor outlet pressure (Pd). The throttle valve 4 is made to stop at the full-open position by a stopper (not shown) even when the accelerator pedal is depressed beyond the position 20b. Meanwhile, the tension spring for absorbing the movement of the link 17 is stretched so that the compressor outlet pressured (Pd) comes equal to (PB) and the pressure (PB) is increased in accordance with the increase of the engine output power.

According to the arrangement, it is possible to suitably set the maximum value (PdL) of the compressor outlet pressure (Pd) by providing a restriction in the pipe 13 or suitably selecting the maximum area of passage in the variable orifice valve 15. For instance, since the variable orifice valve 15 is fully opened when the accelerator pedal is depressed to the position 20d, the compressor outlet pressure (Pd) cannot become higher than the maximum value (PdL) even though the accelerator pedal 20 is further depressed from the position 20d to a position 20e, because the pressure (Pw) in the pressure chamber 124 is increased when the compressor outlet pressure tends to exceed the maximum value (PdL). In consequence, the feedback system mentioned before is completed to open the exhaust by-pass valve 11 thereby to maintain the compressor outlet pressure (Pd) at the constant level of (PdL). Although in this embodiment the variable orifice valve 15 is opened and closed by the electric signal, this is not exclusive and the valve 15 may be controlled mechanically by the accelerator pedal through a suitable link mechanism connected therebetween.

Figure 5:
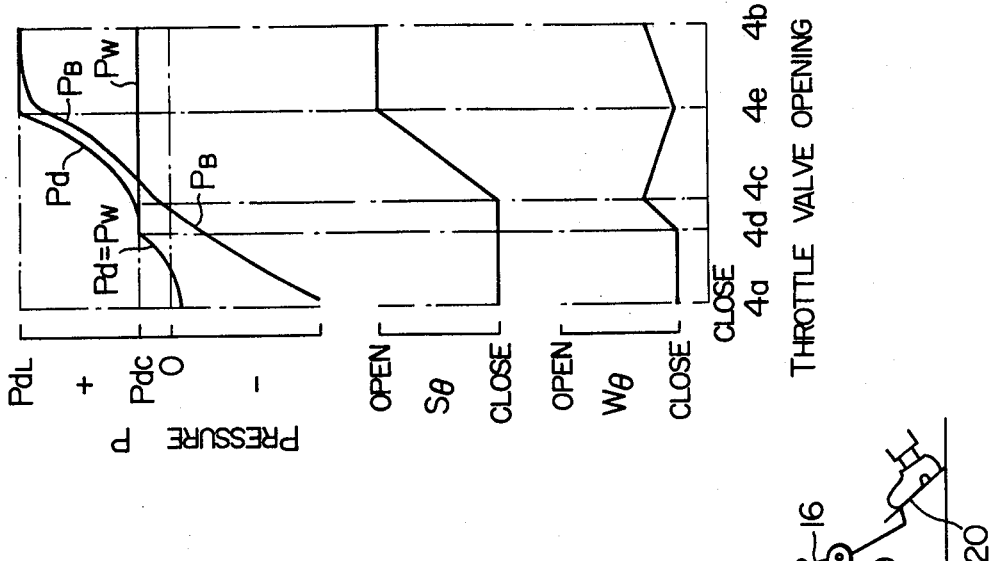
FIG. 5 is an illustration of the operation of the power control system of the second embodiment.
Figure 4:
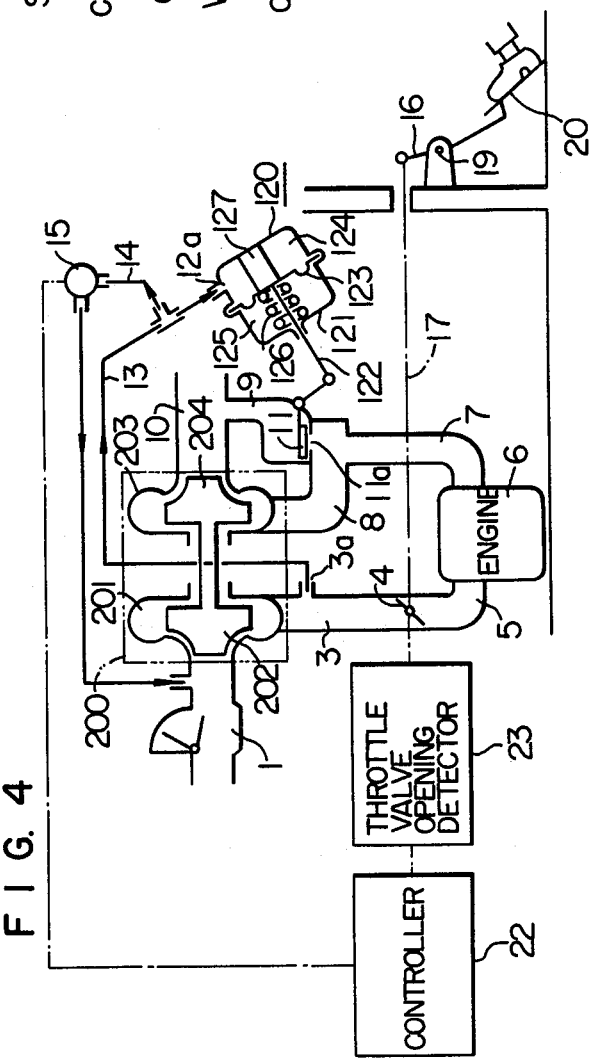
FIG. 4 is an illustration of a power control system for supercharged internal combustion engine, in accordance with a second embodiment of the invention.

A second embodiment of this invention will be described hereinunder with reference to FIGS. 4 and 5. This second embodiment is distinguished from the first embodiment by the following features. Namely, in this second embodiment, the link 16 is connected to the accelerator pedal 20, and is adapted to rotate around a pivot point 19 by an amount proportional to the amount of depression of the accelerator pedal. The link 17 connected to the throttle valve 4 is secured to the other end of the link 16. The arrangement is such that the throttle valve 4 is fully opened when the accelerator pedal is depressed fully. A reference numeral 23 designates a detector for detecting the opening of the throttle valve 4. The throttle valve 4 produces an output which is delivered to the variable orifice valve controller 22 to control the opening of the variable orifice valve 22.

The power control system of the second embodiment having the above-explained feature operates in a manner explained hereinunder. FIG. 5 shows the changes in the compressor outlet pressure (Pd), pressure (PB) in the intake manifold 5, pressure (Pw) in the pressure chamber 124 of the exhaust by-pass valve actuator 120, opening (Sθ) of the variable orifice valve 15 and the opening (Wθ) of the exhaust by-pass valve 11, in relation to the opening of the throttle valve 4.

In the vehicle mounting an internal combustion engine, the control of the output power of the engine after the start up of the latter is made through varying the opening of the throttle valve operatively connected to the accelerator pedal. The throttle valve 4 is rotated continuously from the idle position 4a to the full load position 4b as shown in FIG. 5 thereby to effect the control of the engine output power. The opening of the throttle valve 4 is detected by the detector 23 which then delivers a signal representative of the throttle valve opening to the variable orifice valve controller 22. The controller 22 delivers a closing signal to the variable orifice valve 15 while the throttle valve opening ranges between 4a and 4c. On the other hand, as the throttle valve 4 is opened from the position 4a to 4c, the flow rate of the intake air sucked by the engine 6 is increased, which in turn increases the energy of the exhaust gas utilized in driving the supercharger 200. In consequence, the compressor outlet pressure (Pd) reaches the level (Pdc) when the throttle valve takes the position 4d. This compressor outlet pressure (Pd) is introduced into the pressure chamber 124 of the exhaust by-pass valve actuator 120 through the pressure pick-up port 3a. At this time, since the variable throttle valve 15 is in the fully closed position, the pipe 14 is not communicated with the inlet of the compressor. In consequence, the compressor outlet pressure (Pd) takes the same level as the pressure (Pw) in the pressure chamber 124. Provided that the initial load of the spring 126 is set by the stopper 127 at the level corresponding to the pressure (Pdc), if the compressor outlet pressure is increased to exceed the level (Pdc), the diaphragm 123 is depressed to move the exhaust by-pass valve 11 in the opening direction through the action of the link 122. In consequence, the exhaust by-pass port 11a is opened to permit a part of the exhaust gas from the engine 6 to come into the by-pass pipe 9 and, accordingly, the rate of introduction of the exhaust gas from the exhaust pipe 8 into the turbine chamber 203 of the supercharger 200 is decreased. This means that the work done by the compressor impeller integral with the turbine impeller is decreased, so that the compressor outlet pressure (Pd) is lowered. Thanks to this feedback function, the blower outlet pressure (Pd) is always maintained not higher than the predetermined level (Pdc).

When the throttle valve 4 takes the position 4c, the throttle valve 4 imposes almost no resistance to the flow of the air, so that the blower outlet pressure (Pd) takes a substantially same level as the pressure (PB) in the intake pipe 5.

As a further increase of the engine output power is demanded, the pressure (PB) downstream from the throttle valve 4 is increased to increase the output power of the engine. Namely, as the throttle valve 4 is opened from the position 4c to the position 4b, the detector 23 detects the opening of the throttle valve 4 and produces an output representing the opening to the variable orifice valve controller 22 which in turn delivers an opening signal corresponding to the throttle valve opening to the variable orifice valve 15. Therefore, the blower outlet pressure transmitted through the pipe 13 is connected, through the pipe 14 and the variable throttle valve 15, to the blower inlet which is maintained substantially at the atmospheric pressure so that a difference is created between the blower outlet pressure (Pd) and the pressure (Pw) introduced into the pressure chamber 124. In consequence, relationships as shown in FIG. 5 is achieved between the pressures (Pd), (Pw) and the opening (Sθ) of the variable orifice valve. Namely, the opening (Sθ) of the variable orifice valve 15 is shifted towards the full-open side as the throttle valve opening is changed from 4c to 4b, so that the opening (Wθ) of the exhaust by-pass valve 11 is shifted in the closing direction until the throttle opening reaches the point 4e where the compressor outlet pressure (Pd) reaches the pressure (PdL) as shown in the lower part of FIG. 5. In consequence, the proportion of the by-passing exhaust gas flowing through the exhaust gas inlet port 11a to the total amount of the exhaust gas coming from the exhaust pipe 8 is gradually decreased. Namely, the rate of introduction of the exhaust gas into the turbine housing is gradually increased as the throttle valve opening is increased, so that the amount of work achieved by the supercharger 200 is increased to raise the compressor outlet pressure (Pd). When the opening of the throttle valve 4 is increased beyond the point 4c, the flow resistance imposed by the throttle valve 4 is diminished so that the compressor outlet pressure is reflected upon the intake pressure (PB) in the intake pipe 5 without being changed materially, so that the engine output power is increased.

According to this arrangement, it is possible to determine the maximum value (Pdc) of the compressor outlet pressure (Pd) by providing a restriction in the pipe 13 or by suitably selecting the maximum passage area in the variable orifice valve 15. Namely, since the variable orifice valve 15 is fully opened when the throttle valve 4 is opened to the position 4e, the compressor outlet pressure cannot become higher than the maximum value (PdL) even if the throttle valve 4 is further opened from the position 4e to a position 4b, because, when the compressor outlet pressure tends to become higher than the maximum pressure (PdL), the pressure (Pw) in the pressure chamber 124 is increased to complete the aforementioned feedback loop, so that the exhaust by-pass valve 11 is opened to maintain the compressor outlet pressure at the constant level of (PdL).

As has been described, according to the invention, it is possible to obtain a supercharging pressure corresponding to the demanded engine power, by controlling the pressure introduced into the exhaust by-pass valve actuator by means of a variable orifice valve which is operated in accordance with the depression of the accelerator pedal or the opening of the throttle valve. By maintaining the operating pressure of the exhaust by-pass valve actuator at least at a level lower than the maximum supercharging pressure demanded by the engine, it is possible to eliminate the wasteful work of the supercharger, i.e. the loss of the energy caused by the throttling of the air pressurized by the supercharger, by the throttle valve connected to the downstream side of the supercharger. Furthermore, since the supercharger is maintained in a suitable operating condition under the normal condition of engine operation, it is possible to eliminate undesirable rise of the exhaust pressure and the intake air temperature. Thus, the invention is quite effective in improving the charging efficiency of the engine and, hence, in achieving higher engine output power, while effectively avoiding the undesirable engine knock. In addition, the durability and reliability of the engine are improved remarkably because the supercharger itself, as well as the exhaust and intake systems, is advantageously relieved from the load which is, for otherwise, imposed by continuous full loading of the supercharger and the exhaust and intake systems.

Although the invention has been described through specific terms, it is to be noted that the described embodiments are only illustrative and various changes and modifications may be imparted thereto without departing from the scope and spirit of the invention which are limited solely by the appended claims.

What is claimed is:

1. A power control system for a supercharged internal combustion engine comprising;
   a supercharger including a turbine impeller rotatably disposed in an exhaust pipe of an engine and driven by exhaust gases discharged from said engine, and a compressor impeller rotatably disposed in an intake pipe of said engine and connected to said turbine impeller so that said compressor impeller is driven by said turbine impeller for compressing air and feeding the compressed air to said engine;
   a by-pass pipe connecting an upstream portion of said exhaust pipe and a downstream portion of said exhaust pipe for by-passing said turbine impeller;
   an exhaust by-pass valve disposed in said by-pass pipe for controlling the opening degree of said by-pass pipe; and
   means for actuating said exhaust by-pass valve in response to a depression of an acceleration pedal of said engine, so as to maintain a compressor outlet pressure at a preset value during a partial load operating range of said engine and to increase said compressor outlet pressure to another preset value higher than said first-mentioned preset value when said engine is operated in a higher load operating range,
   wherein said actuating means comprises:
   a valve actuator having a pressure chamber and a diaphragm displacable in response to the pressure in said pressure chamber, said diaphragm being operatively connected to said exhaust by-pass valve, said valve actuator having a spring for urging said diaphragm in a direction of closing said exhaust by-pass valve;
   a pressure pipe connecting said pressure chamber with a portion of said intake pipe downstream of said compressor impeller for supplying the compressed air from said intake pipe to said pressure chamber;
   a return pipe connecting said pressure chamber with a portion of said intake pipe upstream of said compressor impeller;
   a variable orifice valve disposed in said return pipe for controlling the opening degree of said return pipe;
   an acceleration pedal depression detector for detecting a depression degree of said acceleration pedal; and
   control means for driving said variable orifice valve in response to a signal from said acceleration pedal depression detector,
   said variable orifice valve being closed during the partial load operating range of said engine so that the pressure in said pressure chamber of said valve actuator is maintained at a value equal to the compressor outlet pressure and when the pressure in said pressure chamber exceeds a resisting force of said spring of said valve actuator said exhaust by-pass valve is opened for by-passing a part of exhaust gases from said engine through said by-pass pipe so as to maintain the compressor outlet pressure at said preset value, and
   said control means driving said variable orifice valve to open when said engine is operated in the higher load operating range, so as to actuate said exhaust by-pass valve to move in its closing direction in response to the opening degree of said return pipe so that the compressor outlet pressure is increased to said other preset value.

2. A power control system for a supercharged internal combustion engine comprising;
   a supercharger including a turbine impeller rotatably disposed in an exhaust pipe of an engine and driven by exhaust gases discharged from said engine, and a compressor impeller rotatably disposed in an intake pipe of said engine and connected to said turbine impeller so that said compressor impeller is driven by said turbine impeller for compressing air and feeding the compressed air to said engine;

a by-pass pipe connecting an upstream portion of said exhaust pipe and a downstream portion of said exhaust pipe for by-passing said turbine impeller;

an exhaust by-pass valve disposed in said by-pass pipe for controlling the opening degree of said by-pass pipe; and means for actuating said exhaust by-pass valve in response to a depression of an acceleration pedal of said engine, so as to maintain a compressor outlet pressure at a preset value during a partial load operating range of said engine and to increase said compressor outlet pressure to another preset value higher than said first-mentioned preset value when said engine is operated in a higher load operating range, wherein said actuating means comprises:

a valve actuator having a pressure chamber and a diaphragm displacable in response to the pressure in said pressure chamber, said diaphragm being operatively connected to said exhaust by-pass valve, said valve actuator having a spring for urging said diaphragm in a direction of closing said exhaust by-pass valve;

a pressure pipe connecting said pressure chamber with a portion of said intake pipe downstream of said compressor impeller for supplying the compressed air from said intake pipe to said pressure chamber;

a return pipe connecting said pressure chamber with a portion of said intake pipe upstream of said compressor impeller;

a variable orifice valve disposed in said return pipe for controlling the opening degree of said return pipe;

a throttle opening detector for detecting an opening degree of a throttle valve actuated by said acceleration pedal; and control means for driving said variable orifice valve in response to a signal from said throttle opening detector;

said variable orifice valve being closed during the partial load operating range of said engine so that the pressure in said pressure chamber of said valve actuator is maintained at a value equal to the compressor outlet pressure and when the pressure in said pressure chamber exceeds a resisting force of said spring of said valve actuator said exhaust by-pass valve is opened for by-passing a part of exhaust gases from said engine through said by-pass pipe so as to maintain the compressor outlet pressure at said preset value, and said control means driving said variable orifice valve to open when said engine is operated in the higher load operating range, so as to actuate said exhaust by-pass valve to move in its closing direction in response to the opening degree of said return pipe so that the compressor outlet pressure is increased to said other preset value.

* * * * *